United States Patent
Lee et al.

(10) Patent No.: US 11,084,740 B2
(45) Date of Patent: Aug. 10, 2021

(54) CDI-TYPE WATER TREATMENT METHOD

(71) Applicant: COWAY CO., LTD., Chungcheongnam-do (KR)

(72) Inventors: Soo Young Lee, Seoul (KR); Tae Seong Kwon, Seoul (KR); Hyoung Min Moon, Seoul (KR); Byung Kil Park, Seoul (KR); Sung Min Moon, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 474 days.

(21) Appl. No.: 15/103,199

(22) PCT Filed: Dec. 9, 2014

(86) PCT No.: PCT/KR2014/012059
§ 371 (c)(1),
(2) Date: Jun. 9, 2016

(87) PCT Pub. No.: WO2015/099320
PCT Pub. Date: Jul. 2, 2015

(65) Prior Publication Data
US 2016/0355418 A1 Dec. 8, 2016

(30) Foreign Application Priority Data
Dec. 23, 2013 (KR) .......... 10-2013-0161066

(51) Int. Cl.
*C02F 1/469* (2006.01)
*C02F 1/467* (2006.01)
*C02F 1/461* (2006.01)

(52) U.S. Cl.
CPC .......... *C02F 1/4691* (2013.01); *C02F 1/4674* (2013.01); *C02F 2001/46142* (2013.01);
(Continued)

(58) Field of Classification Search
CPC .......... C02F 1/46–4618; C02F 2209/10; C02F 2001/46119; C02F 2301/08; C02F 1/4691;
(Continued)

(56) References Cited

U.S. PATENT DOCUMENTS 6,045,704 A    4/2000 Sato et al.
2002/0154469 A1  10/2002 Shiue et al.
(Continued)

FOREIGN PATENT DOCUMENTS

CN    1188744 A     11/1997
CN    102786174 A   11/2012
(Continued)

OTHER PUBLICATIONS

European Search Report for corresponding EP Application No. 14875126.6, dated Oct. 25, 2016.
(Continued)

*Primary Examiner* — Xiuyu Tai
(74) *Attorney, Agent, or Firm* — Renner, Otto, Boisselle & Sklar, LLP

(57) ABSTRACT

A CDI-type water treatment device according to the present invention comprises: a filter unit for purifying raw water in a CDI type through an electrode part formed by alternately stacking electrodes and separators; and a sterilization unit provided on the front of the filter unit to supply the electrode part with a sterilization substance, which has been generated from the raw water in order to sterilize the electrode part. The sterilization unit, in this case, preferably operates after a predetermined time has passed since the electrode part has both stopped purifying raw water and stopped regenerating the electrodes.

14 Claims, 10 Drawing Sheets

(52) U.S. Cl.
CPC .... *C02F 2201/48* (2013.01); *C02F 2209/005* (2013.01); *C02F 2209/10* (2013.01); *C02F 2209/40* (2013.01); *C02F 2303/04* (2013.01); *C02F 2305/02* (2013.01)

(58) Field of Classification Search
CPC .......... C02F 1/4674; C02F 2001/46142; C02F 2201/48; C02F 2209/005; C02F 2209/40; C02F 2303/04; C02F 2305/02; C02F 1/4672; C02F 1/463; C02F 2103/24; C02F 1/481; C02F 1/78; C02F 1/283; C02F 2103/008; C02F 1/484; C02F 9/005; C02F 1/4676; C02F 1/441; C02F 2209/42; C02F 2209/05; C02F 2201/4616; C02F 2201/46145; C02F 2001/46128; C02F 2001/46135; C02F 2209/03; C02F 2201/4613; C02F 2201/4615; C02F 2201/007; C02F 2201/4614; C02F 2303/22; C02F 2209/02; C02F 1/008; C25B 1/13; C25B 15/08; C25B 15/02; C25B 1/14; C25B 9/063; C25B 1/26; C25B 9/18; B01D 35/06; B01D 61/025; B01D 61/12; B01D 2311/06; B01D 2311/2649; B01D 2311/2692; B01D 2311/04; B01D 2311/2626; C25F 1/00; Y02W 10/37
See application file for complete search history.

(56) References Cited

U.S. PATENT DOCUMENTS

| | | | |
|---|---|---|---|
| 2005/0103717 A1 | 5/2005 | Jha et al. | 210/652 |
| 2012/0048741 A1* | 3/2012 | Stewart | C02F 1/4674 |
| | | | 205/337 |
| 2013/0062219 A1* | 3/2013 | Lee | B01D 61/025 |
| | | | 205/742 |
| 2013/0134080 A1* | 5/2013 | Shiue | C02F 1/463 |
| | | | 210/192 |
| 2013/0175165 A1* | 7/2013 | Okazaki | C23C 10/22 |
| | | | 204/290.14 |
| 2013/0277222 A1 | 10/2013 | Kwon et al. | |
| 2014/0353167 A1 | 12/2014 | Cho | |

FOREIGN PATENT DOCUMENTS

| | | |
|---|---|---|
| EP | 1291324 A2 | 3/2003 |
| JP | 11-90129 A | 4/1999 |
| JP | 2001-70947 A | 3/2001 |
| JP | 2003-285066 A | 10/2003 |
| JP | 2005-87898 A | 4/2005 |
| JP | 2007-513748 A | 5/2007 |
| JP | 2009-190016 A | 8/2009 |
| JP | 10-0973669 B1 | 8/2010 |
| KR | 2009-0012948 | 2/2009 |
| KR | 10-2012-00021889 A | 1/2012 |
| KR | 2012-0078611 | 7/2012 |
| KR | 10-2012-0135141 A | 12/2012 |
| KR | 10-2012-0135783 A | 12/2012 |
| KR | 2013-0077784 | 7/2013 |
| KR | 10-2013-0096521 A | 8/2013 |
| KR | 2013-0107830 | 10/2013 |
| WO | WO2012/091500 * | 7/2012 |
| WO | WO 2012/165694 A1 | 12/2012 |
| WO | 2013/006438 A1 | 1/2013 |

OTHER PUBLICATIONS

Office Action to corresponding Korean Application No. 10-2013-0161066, dated Sep. 28, 2017.
International Search Report for Corresponding International Application No. PCT/KR2014/012059, dated Mar. 13, 2015 and English translation thereof.
Office Action to corresponding Chinese Application No. 201480070459.7, dated Sep. 3, 2018.
Office Action to corresponding Japanese Application No. 2016-542684, dated Oct. 9, 2018.

* cited by examiner

CDI-TYPE WATER TREATMENT METHOD

TECHNICAL FIELD

The present invention relates to a CDI-type water treatment device, more specifically to a CDI-type water treatment device capable of performing sterilization without the need to additionally supply a chemical substance as a sterilization substance, thereby preventing in advance a problem caused by bacteria.

BACKGROUND ART

Currently, a variety of devices for treating water such as water purifiers which treat raw water to generate purified water are disclosed. Recently, however, devices for treating water by an electro deionization (EDI) method such as electro deionization (EDI), continuous electro deionization (CEDI) and capacitive deionization (CDI) take center stage. Among them, the most favoured one is a CDI-type water treatment device.

The CDI method refers to a method of removing an ion (a contaminant) using a principle of adsorbing and desorbing ion at a surface of an electrode by an electrical force. This will be further described with reference to FIGS. 9 and 10. When passing raw water including an ion between the electrodes with power supplied to the electrode, an anion moves to anode and a cation moves to cathode, as illustrated in FIG. 9. In other words, adsorption occurs. By means of the adsorption, the ion included in the raw water may be removed. Meanwhile, when the adsorption continues, the electrode cannot adsorb the ion any longer. Even in this case, as illustrated in FIG. 10, it is necessary to desorb the ions adsorbed in the electrode to regenerate the electrode. To this end, a voltage with an opposite polarity of purified water may be applied. In this case, regeneration water is generated and discharged.

DETAILED DESCRIPTION OF THE INVENTION

Technical Task

The inventors of the present invention found the fact that as the CDI-type water treatment device is used, bacteria are formed in a filter (more exactly, in an electrode part which will be described later) and thus a lifespan of the filter is reduced. More specifically, as the CDI-type water treatment device is used, bacteria flow in the filter through raw water or bacteria increase in the filter, thereby forming a lot of bacteria in the filter. When bacteria are formed, a biofilm, etc. is formed, and thereby a pressure drop of the filter increases. This may reduce extract flow of purified water and also deteriorate purification performance by contaminating an electrode surface of the filter. Thus, in order to continuously use the CDI-type water treatment, it is necessary to sterilize the filter. However, an additional introduction of the chemical substance for this may cause problems in lifespan of electrodes, taste and odor, stability, etc.

The present invention is to solve the above-mentioned problems. The task of the present invention is to provide a CDI-type water treatment device capable of performing sterilization without the need to additionally supply a chemical substance as a sterilization substance, thereby preventing in advance problems caused by bacteria. Additionally, the task of the present invention is to provide a CDI-type water treatment device where a rejection of a contaminant is not reduced even if the sterilization is performed.

Technical Means for Achieving the Technical Task

The CDI-type water treatment device according to the present invention includes a filter unit for purifying raw water in a CDI type through an electrode part formed by alternately stacking electrodes and separators; and a sterilization unit provided on the front of the filter unit to supply the electrode part with a sterilization substance, which has been generated from the raw water in order to sterilize the electrode part. The sterilization unit, in this case, preferably operates when the electrode part has both stopped purifying raw water and stopped regeneration the electrodes.

Advantageous Effects

The CDI-type water treatment device according to the present invention reduces chlorine ion (Cl—) in raw water to chlorine ($Cl_2$) to generate the sterilization substance. Thus, the CDI-type water treatment device may perform the sterilization without the need to additionally supply the chemical substance as the sterilization substrate, thereby preventing in advance the problems caused by bacteria. Additionally, since the CDI-type water treatment device according to the present invention provides the sterilization substance to the electrode part when both the water-purifying mode and regeneration mode are not performed, the CDI-type water treatment device may not only inhibit the increase of pressure drop, but mostly maintain the TDS rejection constantly.

BEST MODE FOR CARRYING OUT THE INVENTION

Hereinafter, preferable embodiments of the present invention will be explained in detail with reference to the drawings attached. However, the present invention is not limited or restricted by the embodiments below.

Figure 1:
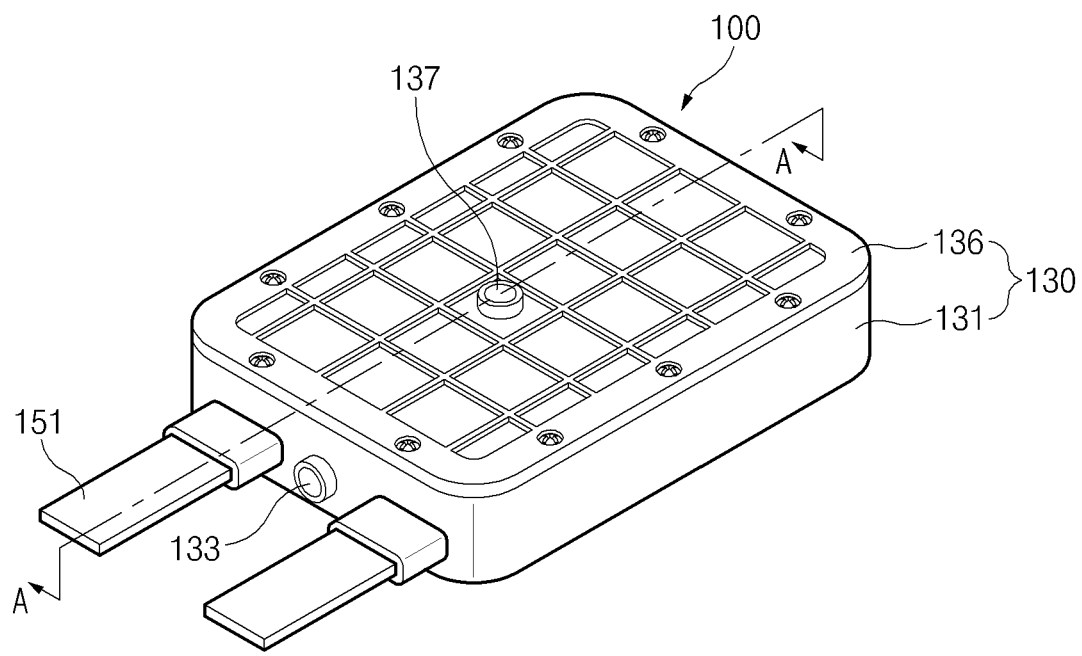
FIG. 1 is a perspective view illustrating a filter unit according to an embodiment of the present invention.
Figure 2:
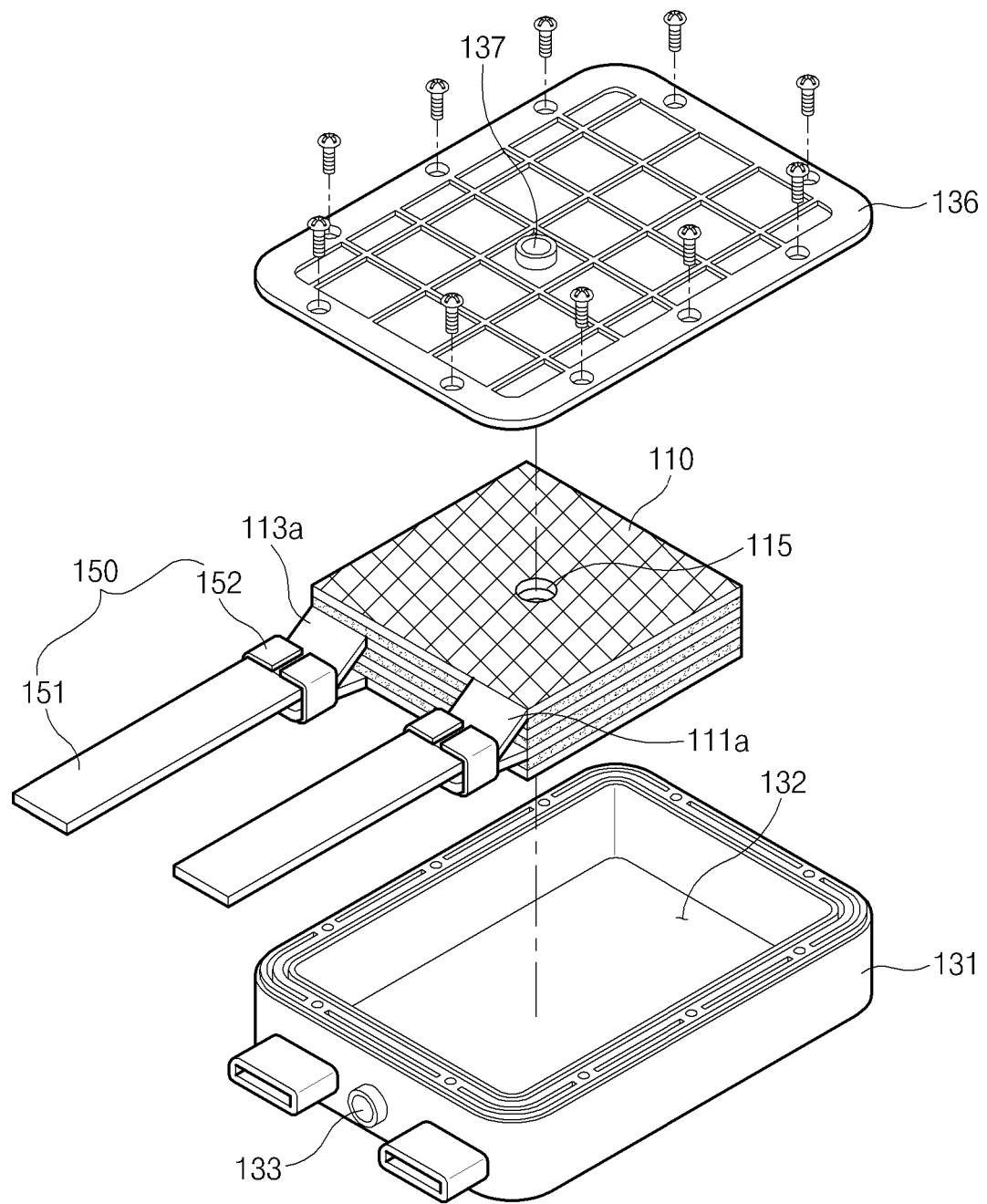
FIG. 2 is an exploded perspective view illustrating the filter unit of FIG. 1.
Figure 3:
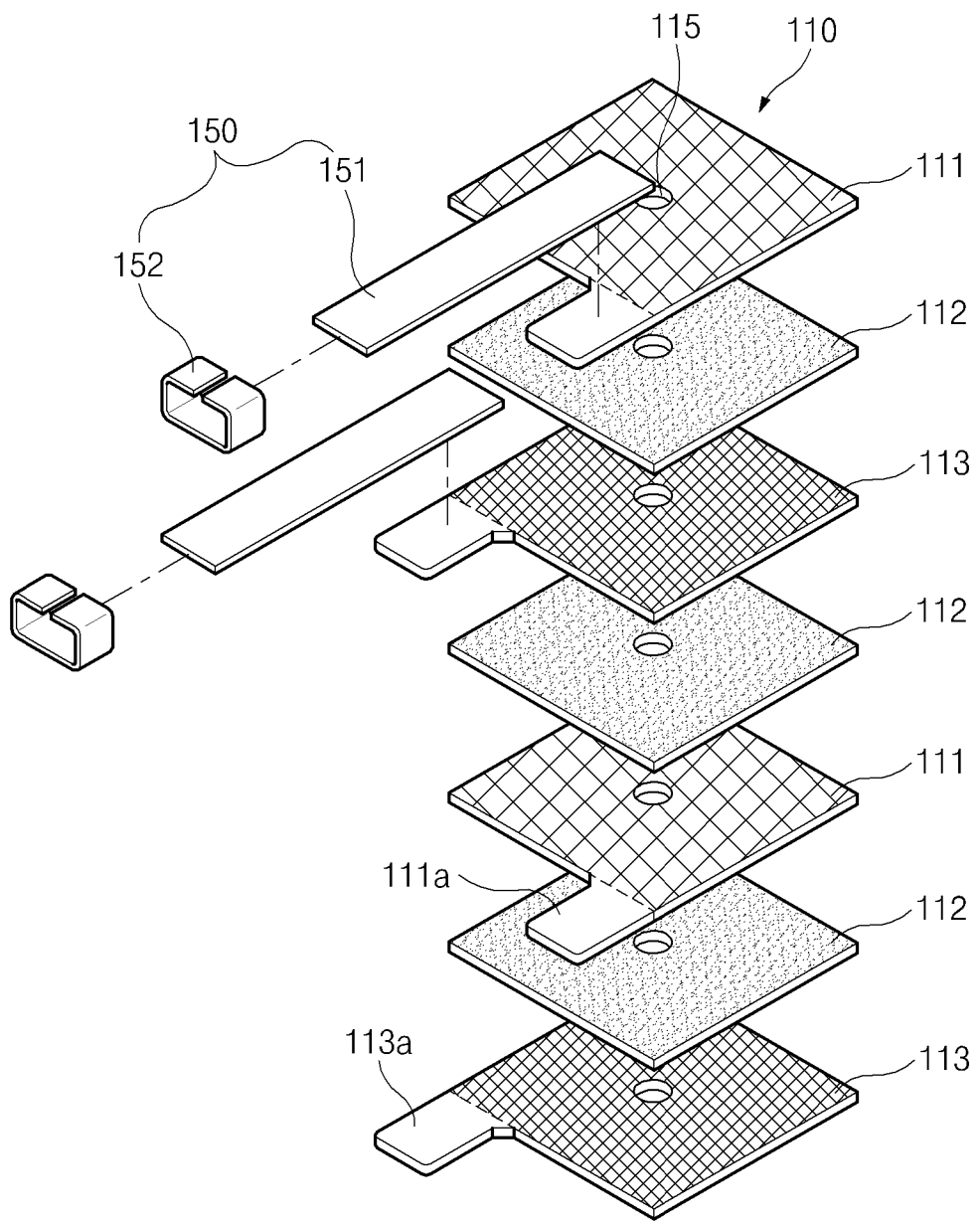
FIG. 3 is an exploded perspective view illustrating an electrode part and a terminal part of the filter unit of FIG. 1.
Figure 4:
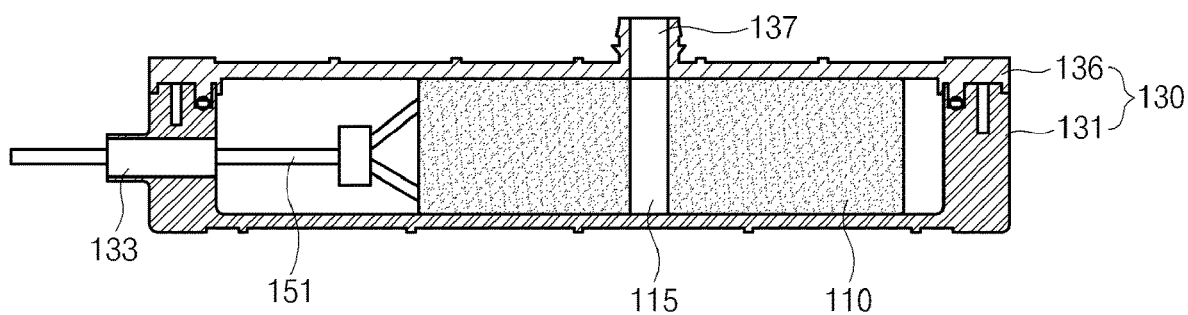
FIG. 4 is a cross-sectional view taken along line A-A of the filter unit of FIG. 1.

FIG. 1 is a perspective view illustrating a filter unit according to an embodiment of the present invention, FIG. 2 is an exploded perspective view illustrating the filter unit of FIG. 1, FIG. 3 is an exploded perspective view illustrating an electrode part and a terminal part of the filter unit of FIG. 1, and FIG. 4 is a cross-sectional view taken along line A-A of the filter unit of FIG. 1. The water treatment device according to an embodiment of the present invention relates to a CDI-type water treatment device, which includes a filter unit 100 and a sterilization unit 200.

[Filter Unit]

The filter unit 100 includes an electrode part 110, a filter case part 130 and a terminal part 150. First of all, the electrode part 110 will be described. The electrode part 110 plays a role of purifying raw water using a CDI method. More specifically, as illustrated in FIG. 3, the electrode part 110 is formed as electrodes 111 and 113 and a separator 112 are alternately stacked. In this case, the electrodes include an anode 111 and a cathode 113. In other words, the electrode part 110 is formed as the anode 111 and the cathode 113 are oppositely stacked through the separator 112. Here, the separator 112 forms a gap between the anode 111 and cathode 113.

In general, however, the electrodes 111 and 113 may be formed by coating an activated carbon on both sides of a graphite foil. In this case, the graphite foil may include a body portion coated with the activated carbon (see the slashed portion in FIG. 3), and protrusion portions 111a and 113a which are protruded from the main portion but are not coated with the activated carbon. Here, the protrusion portions 111a and 113a form electrode taps of the electrodes 111 and 113. The electrode part 110 may be operated by supplying power (or voltage or current) to the electrodes 111 and 113 through the electrode tabs 111a and 113a.

Meanwhile, it is necessary to electrically separate the anode 111 and cathode 113. Thus, as illustrated in FIG. 3, it is preferable that an anode tap 111a and a cathode tap 113a are separated from each other. However, as illustrated in FIG. 3, it is preferable that the anode tap 111 is protruded in the same direction at the same position with the anode tap 111, and that the cathode tap 113a is protruded in the same direction at the same position with the cathode tap 113a. Then, it is convenient to supply power to the anode tap 111a and cathode tap 113a, respectively.

Next, a filter case part 130 will be described. As illustrated in FIG. 2, the filter case part 130 accommodates the electrode part 110. More specifically, an opening 132 is formed at the top of the filter case part 130, and the filter case part includes a lower case 131 in which the electrode part 110 is accommodated and an upper case 136 sealing the opening 132 of the lower case 131. In other words, the electrode part 110 is inserted into the inside of the lower case 131 through the opening 132 of the lower case 131, and then the opening 132 of the lower case 131 is sealed with the upper case 136. Here, the lower case 131 has an inlet 133 on its side into which raw water enters, and the upper case 136 has an outlet 137 on its top from which purified water exits. In this case, the outlet 137 is formed to correspond to an outlet hole 115 of the electrode part 110.

According to the structure above, raw water is purified by the following process: First, raw water is supplied to the inside of the filter case part 130 through the inlet 133. Next, by the pressure resulting from this supplying, the raw water enters into the inside of the electrode part 110 through the side surface of the electrode part 110. The raw water then flows between the anode 111 and cathode 113 inside the electrode part 110 to be purified according to the CDI method. Then, the raw water (that is, purified water) is discharged to the outside of the electrode part 110 through an outlet hole 115. Then, the raw water is discharged to the outside of the filter case part 130 through the outlet 137.

Next, a terminal part 150 will be described. The terminal part 150 is electrically connected to the electrode taps 111a and 113a to supply power from external power (not illustrated) to the electrodes 111 and 113. More specifically, as illustrated in FIGS. 2 and 3, the terminal part 150 includes a conductive electrode terminal 151 contacting with the electrodes taps 111a and 113a at one end. (When supplying power to the other end of the electrode terminal with the electrodes taps contacting with one end of the electrode end, power may be supplied to the electrode taps through the electrode terminal.)

It is preferable that the electrode terminal 151 is made of stainless steel. This also applies to a terminal band 152 which will be described later. This is because stainless steel is inexpensive and has good electrical conductivity. However, stainless steel has a limitation that the stainless steel becomes oxidized according to the current flow and thus rust may occur. In order to solve this limitation, it may be considered to form the electrode terminal 151 with titanium (Ti). However, since titanium may be oxidized according to the current flow, electrical conductivity may be weakened.

Accordingly, it is most preferable to form the electrode terminal 151 with platinum (Pt). This also applies to the terminal band 152 which will be described later. This is because platinum does not have problems that platinum is oxidized and thus rust occurs, or electrical conductivity is weakened. Meanwhile, considering that platinum is expensive, it may be considered to form the electrode terminal 151 by coating platinum on the surface.

However, the terminal part 150 may include a conductive terminal band 152 enclosing the electrode tap 111a or 113a along with the electrode terminal 151. In this case, it is preferable that the terminal band 152 encloses the electrode taps 111a and 113a along with the electrode terminal 151 so that the electrode taps 111a and 113a could be compressed inwardly. In addition, it is preferable that the terminal band 152 encloses the electrode taps 111a and 113a at least one round along with the electrode terminal 151 from the outside of the electrode taps 111a and 113a.

[Sterilization Unit]

A sterilization unit 200 plays a role of generating a sterilization substance from raw water to supply the sterilization substance to the electrode part 110 in order to sterilize the electrode part 110. In order to generate the sterilization substance, the sterilization unit 200 may reduce chlorine ion ($Cl^-$) in raw water to chlorine ($Cl_2$). In order to reduce the chlorine ion to chlorine, the sterilization unit 200 may include a sterilization terminal part 205 coated with ruthenium oxide (RuOx), and a sterilization case part 210 accommodating the sterilization terminal part 205. A description thereof will be further described below.

When power (or current or voltage) is applied to the sterilization terminal part 205, chlorine ion in raw water may be reduced to chlorine by ruthenium oxide of the sterilization terminal part 205 (raw water generally includes chlorine ion by itself). Ruthenium oxide serves as a catalyst decreasing potential difference when reducing chlorine ion to chlorine. The chlorine thus generated may melt right away in raw water and could be hypochlorous acid (HOCl). HOCl is a sterilization substance capable of sterilizing bacteria and is a mixed oxidant. This sterilization unit 200 reduces chlorine ion in raw water to generate the sterilization substance.

Accordingly, the water treatment device according to the present embodiment may sterilize the electrode part 110 without the need to further supply a chemical substance as the sterilization substance. Additionally, the water treatment device according to the present embodiment prevents in advance problems which occur due to bacteria through the sterilization so that the device may be semi-permanently used.

The sterilization terminal part 205 may be prepared as below. First, ruthenium is coated on a metal terminal such as the electrode terminal 151. Next, the metal terminal is heated at a high temperature. By means of the heating, ruthenium may be oxidized to ruthenium oxide. Accordingly, ruthenium oxide mostly exists on the surface of the metal terminal. Here, a platinum group metal such as platinum or iridium may be used instead of ruthenium. However, it is most effective to use ruthenium.

Figure 5:
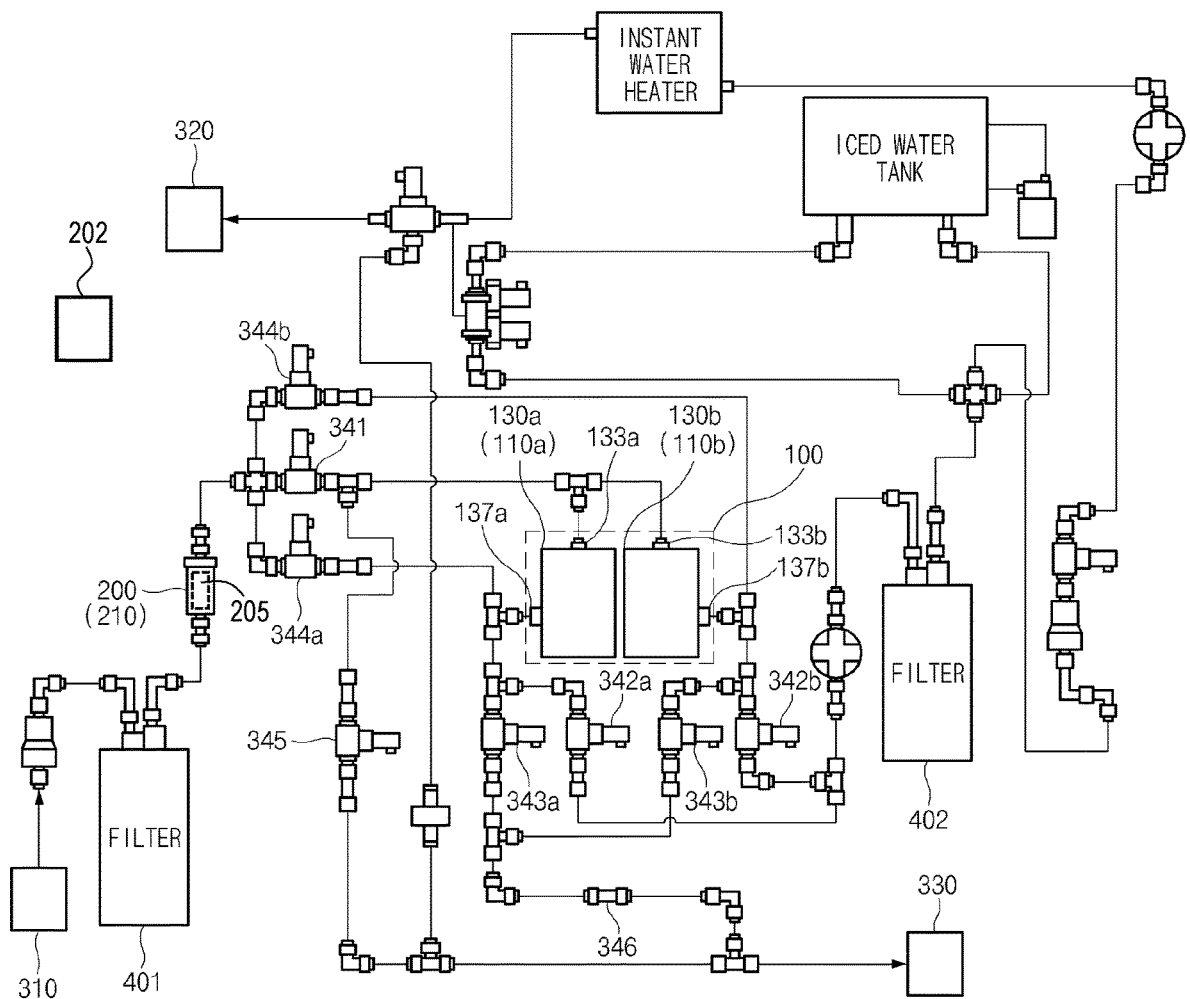
FIG. 5 is a schematic view schematically illustrating the water treatment device according to an embodiment of the present invention.

However, as illustrated in FIG. 5 which will be mentioned later, the sterilization unit 200 may be prepared at the front of the filter unit 100. When the sterilization unit 200 is prepared as above, the sterilization unit 200 may be independently operated regardless of the filter unit 100. Accordingly, when operating the sterilization unit 200, raw water including the sterilization substance may be supplied to the electrode part 110, and when stopping the sterilization unit 200, raw water which does not include the sterilization substance may be supplied to the electrode part 110. As such, when operating the sterilization unit 200 selectively, a lifespan of the sterilization terminal part 205 may be extended. Additionally, when operating the sterilization unit 200 independently, the problems caused by bacteria such as the increase of pressure drop may be solved and also the TDS (Total Dissolved Solids) rejection may be maintained.

[Control of Sterilization Unit]

The water treatment device according to the present embodiment may be in a water-purifying mode, a regeneration mode and a sterilization mode. The water-purifying mode is a mode which purifies raw water in the electrode part 110, the regeneration mode is a mode which regenerates electrodes 111 and 113 in the electrode part 110, and the sterilization mode is a mode which sterilizes bacteria in the electrode part 110 through the sterilization unit 200. The water treatment device according to present embodiment may include a control unit 202 which controls power supplied to the sterilization terminal part 205 in order to operate the sterilization mode.

Here, it is preferable for the control unit 202 to perform a control of supplying power to the sterilization terminal part 205 when in the sterilization mode among the water-purifying mode, regeneration mode and sterilization mode. Inventors of the present invention found the fact that when supplying the sterilization substance such as HOCl to the filter unit 100 during the operation of filter unit 100 such as in water-purifying mode or regeneration mode, iron oxide (FeOx), etc. may occur, thereby reducing the TDS rejection of the filter unit 100. Since iron oxide has a small particle size, iron oxide may be jammed in a gap and thus may not be properly discharged from the electrode. When iron oxide is not discharged, it is difficult for the electrodes to be regenerated properly. Thus, it is preferable that the sterilization mode is performed when both the water-purifying mode and regeneration mode are not performed.

Meanwhile, when frequently performing the sterilization mode, power may be wasted or a lifespan of the sterilization terminal part 205 may be reduced. Thus, it is preferable that the sterilization mode is performed after a predetermined time (about 4 hours) passed with the water-purifying mode and regeneration mode not performed. In this case, the predetermined time may be properly selected according to the time that bacteria increase in the electrode part 110.

Meanwhile, it is preferable that the control unit 202 determines the strength of power to be supplied to the sterilization terminal part 205 in the sterilization mode according to the TDS of raw water. When the TDS of raw water is high, this means that the concentration of chlorine ion in raw water could be high. Thus, when the TDS of raw water is high, it is preferable to reduce the strength of power to be supplied to the sterilization terminal part 205 in the sterilization mode. Even if the strength of power is low, since the concentration of chlorine ion in raw water is high, the sterilization substance may be fully generated. In comparison, when the TDS of raw water is low, it is preferable to enlarge the strength of power to be supplied to the sterilization terminal part 205 in the sterilization mode. Here, the TDS of raw water may be estimated by installing an additional TDS sensor at the front of the filter case part 130.

However, when the control is made so that a certain voltage is applied to the electrodes 111 and 113 in the water-purifying mode, the strength of current flowing in the electrodes 111 and 113 may vary depending on the TDS of raw water. That is, when the TDS of raw water is high, the current flowing in the electrodes 111 and 113 is high. When the TDS of raw water is low, the current flowing in the electrodes 111 and 113 is low. Thus, even if an additional TDS sensor is not installed, the TDS of raw water may be estimated based on the strength of current flowing in the electrodes 111 and 113. Thus, even if there is no additional TDS sensor, the strength of power to be supplied to the sterilization terminal part 205 in the sterilization mode may be determined according to the strength of current flowing in the electrodes 111 and 113 in the water-purifying mode.

[Structure of Water Treatment Device]

FIG. 5 is a schematic view schematically illustrating the water treatment device according to an embodiment of the present invention. As illustrated in FIG. 5, the water treatment device according to an embodiment of the present invention not only includes a filter unit 100, a sterilization unit 200, a control unit 202, but includes a supply unit 310 which supplies raw water to the filter unit 100, a purge unit 320 which purges purified water to the user, a discharge unit 330 which discharges regeneration water to the outside, and a valve unit.

Here, the supply unit 310 may be implemented in various ways. As an example, the supply unit 310 may be a conduit to receive raw water from the outside. Additionally, the purge unit 320 may be implemented in various ways. As an example, the purge unit 320 may be a cock for selectively supplying purified water to the user. Also, the discharge unit 330 may be implemented in various ways. As an example, the discharge unit 330 may be a conduit to discharge regeneration water to the outside.

In addition, the valve unit may include a supply valve 341 installed on a flow path passing from the supply unit 310 to an inlet 133; a purge valve 342 installed on a flow path passing from an outlet 137 to the purge unit 320; a discharge valve 343 installed on a flow path passing from the outlet 137 to the discharge unit 330; a washing valve 344 installed on a flow path passing from the front of the supply valve 341 to the outlet 137; and a drain valve 345 installed on a flow path passing from the rear of the supply valve 341 to the outside. Valves of the valve unit may be implemented as a solenoid valve for electronic control. For reference, the front of the supply valve 341 means a left side of the supply valve 341 based on FIG. 5, and the bottom of the supply valve 341 means a right side of the supply valve 341 based on FIG. 5.

However, as illustrated in FIG. 5, the filter unit 100 may include two electrode parts 110a and 110b. The electrode parts 110a and 110b need to regenerate electrodes. However, when there is one electrode part, purified water cannot be generated during the regeneration of electrode. Thus, in order to generate purified water regardless of the regeneration of electrode, it is preferable that the filter unit 100 includes two electrode parts 110a and 110b. In other words, when any one of the electrode part is in the regeneration mode, it is preferable that the other electrode part is in the water-purifying mode. Accordingly, as illustrated in FIG. 5, the purge valves 342a and 342b, discharge valves 343a and 343b, and washing valves 344a and 344b may be prepared in pairs (the filter case parts are prepared to correspond to the electrode parts, respectively).

Here, it is preferable that raw water is selectively supplied to the inlet 133a and 133b or outlet 137a and 137b by passing the sterilization case part 210, since it is more advantageous in sterilizing the electrode parts 110a and 110b to supply raw water including the sterilization substance to the side of the electrode parts 110a and 110b or to an outlet hole 115 of the electrode parts 110a and 110b, as needed (FIG. 4).

Hereinafter, the control of valves by the control unit 202 will be described. First, the water-purifying mode will be explained. When a first electrode part 110a is in the water-purifying mode, only the supply valve 341 and purge valve 342a are open. The rest of valves of the valve unit are closed. In case of such opening and closing, raw water may be supplied to the user through the purge unit 320 after being purified through the first electrode part 110a.

When a second electrode part 110b is in the water-purifying mode, only the supply valve 341 and purge valve 342b are open. In other words, this is the same as the case where the first electrode part is in the water-purifying mode. In case of such opening and closing, the raw water may be supplied to the user through the purge unit 320 after being purified through the second electrode part 110b. In this case, for water purification, it is necessary for the control unit 202 to supply power to the electrode terminal of the first electrode part 110a or the electrode terminal of the second electrode part 110b. However, as mentioned above, it is not necessary to supply power to the sterilization terminal part 205 in the water-purifying mode. This also applies to the regeneration mode which will be described later.

Next, the regeneration mode will be explained. When the first electrode part 110a is in the regeneration mode, only the supply valve 341 and discharge valve 343a are open. The rest will be closed. In case of such opening and closing, the raw water may be discharged to the outside through the discharge unit 330 by passing the first electrode part 110a. When the second electrode part 110b is in the regeneration mode, only the supply valve 341 and discharge valve 343b are open. That is, this is the same as the case where the first electrode part is in the regeneration mode. In case of such opening and closing, the raw water may be discharged to the outside through the discharge unit 330 by passing the second electrode part 110b. In this case, for the regeneration, it is necessary for the control unit 202 to supply power to the electrode terminal of the first electrode part 110a or the electrode terminal of the second electrode part 110b.

In this case, the water-purifying mode and regeneration mode may be performed in a complex way. For example, when the first electrode part 110a is in the water-purifying mode and the second electrode part 110b is in the regeneration mode, only the supply valve 341, purge valve 342a and discharge valve 343b are open.

Next, the back washing in the sterilization mode will be explained. When back-washing the first electrode part 110a, only the washing valve 344a and drain valve 345 are open. The rest will be closed. In case of such opening and closing, the raw water may enter into the first electrode part 110a through the outlet 137a of the first filter case part 130a and be discharged to the outside through the inlet 133a of the first filter case part 130a. In this case, the raw water may be immediately discharged to the outside, and may be discharged to the outside through the discharge unit 330 as illustrated in FIG. 5 (the direction that the raw water flows in the back washing is opposite to the direction that the raw water flows in the water-purifying mode or in the regeneration mode. Thus, "back" is added to "washing").

When back-washing the second electrode part 110b, only the washing valve 344b and drain valve 345 are open. That is, this is the same as the case where the first electrode part 110a is back-washed. In case of such opening and closing, the raw water may enter into the second electrode part 110b through the outlet 137b of the second filter case part 130b and then be drained to the outside through the inlet 133b of the second filter case part 130b. In this case, the control unit 202 may supply power to the sterilization terminal part 205 during the back washing for the sterilization of the first electrode part 110a or the second electrode part 110b.

Alternatively, the normal washing and back washing may be interchangeably used as follows: First, only the washing valve 344a and discharge valve 343b are open.

The rest will be closed. In case of such opening and closing, the raw water may be discharged to the outside by going through the outlet 137a of the first filter case part 130a→the first electrode part 110a→the inlet 133a of the first filter case part 130a→the inlet 133b of the second filter case part 130b→the second electrode part 110b→the outlet 137b of the second filter case part 130b. In this case, the control unit 202 may supply power to the sterilization terminal part 205 for sterilization.

As another alternative, only the washing valve 344b and discharge valve 343a are open. In case of such opening and closing, the raw water may be discharged to the outside by going through the outlet 137b of the second filter case part 130b→the second electrode part 110b→the inlet 133b of the second filter case part 130b→the inlet 133a of the first filter case part 130a→the first electrode part 110a→the outlet 137a of the first filter case part 130a. In this case, the control unit 202 may supply power to the sterilization terminal part 205 for sterilization.

Next, the reverse sterilization (second sterilization) in the sterilization mode will be explained. When reverse-sterilizing the first electrode part 110a, only the washing valve 344a and drain valve 345 are open. The rest will be closed. In case of such opening and closing, the raw water may enter into the first electrode part 110a through the outlet 137a of the first filter case part 130a, and then be discharged to the outside through the inlet 133a of the first filter case part 130a. In this case, the raw water may be immediately discharged to the outside, and may be discharged to the outside through the discharge unit 330 as illustrated in FIG. 5 (the direction that the raw water flows in the reverse sterilization is opposite to the direction that the raw water flows in the water-purifying mode or in the regeneration mode. Thus, "reverse" is added to "sterilization").

When reverse-sterilizing the second electrode part 110b, only the washing valve 344b and drain valve 345 are open. That is, this is the same as the case where the first electrode part 110a is reversely sterilized. In case of such opening and closing, the raw water may enter into the second electrode part 110b through the outlet 137b of the second filter case part 130b, and then be drained to the outside through the inlet 133b of the second filter case part 130b. In this case, it is necessary for the control unit 202 to supply power to the sterilization terminal part 205 during the reverse sterilization for the sterilization of the first electrode part 110a or second electrode part 110b.

Finally, the normal sterilization (first sterilization) in the sterilization mode will be explained. When normally sterilizing the first electrode part 110a, only the supply valve 341 and discharge valve 343a are open. The rest will be closed. In case of such opening and closing, the raw material may enter into the first electrode part 110a through the inlet 133a of the first filter case part 130a, and then be discharged to the outside through the outlet 137a of the first filter case part 130a (for comparison with the reverse sterilization, the first sterilization will be referred to as normal sterilization).

When normally sterilizing the second electrode part 110b, only the supply valve 341 and discharge valve 343b are open. That is, this is the same as the case where the first electrode part 110a is normally sterilized. In case of such opening and closing, the raw water may enter into the second electrode part 110b through the inlet 133b of the second filter case part 130b and then be discharged to the outside through the outlet 137b of the second filter case part 130b. In this case, it is necessary for the control unit 202 to supply power to the sterilization terminal part 205 during the normal sterilization for the sterilization of the first electrode part 110a or the second electrode part 110b. For reference, considering the flow of raw water, the normal sterilization is suitable for the sterilization at the inlet 137 in the electrode part 110, and the reverse sterilization is suitable for the sterilization at the outlet 137 of the electrode part 110.

Here, it is preferable that the back washing, reverse sterilization and normal sterilization during the sterilization mode are performed in a complex way. In this case, it is preferable that the normal sterilization is performed after the reverse sterilization. Compared to the case where purified water is generated as the water-purifying mode is performed after the normal sterilization, the case where purified water is generated as the water-purifying mode is performed after the reverse sterilization is highly likely to have the residue sterilization substance included in purified water and supplied to the user (the sterilization substance at entry may pass the CDI-type electrode part and then be removed). It is preferable that the normal sterilization is performed last. Additionally, considering the object of the back washing (to remove particulate materials which will be mentioned later), it is preferable that the back washing is performed before the reverse sterilization or normal sterilization.

However, it is preferable that discharge flow (corresponding to a first flow where the raw water is supplied to the inlet during the normal sterilization) discharged to the outside through the discharge unit 330 during the normal sterilization or the discharge flow (corresponding to a second flow where the raw water is supplied to the outlet during the reverse sterilization) discharged to the outside through the discharge unit 330 during the reverse sterilization is smaller than the discharge flow (corresponding to a third flow where the raw water is supplied to the outlet during the back washing) discharged to the outside through the discharge unit 330 during the back washing.

This will be described in detail. In the electrode part 110, a particulate material stays more in the inlet 133 than in the outlet 137. Thus, in order to remove the material, it is preferable to allow the raw water to strongly flow from the outlet 137 to the inlet 133 (see FIG. 4). Accordingly, considering that a basic role of the back washing is to remove the particulate material, it is preferable that the discharge flow during the back washing is high.

However, the amount of sterilization substance generated in the sterilization unit 200 is limited. Thus, as the flow increases, the concentration of sterilization substance reduces, and thereby a sterilization effect cannot help being reduced. Accordingly, considering that a basic role of the normal sterilization or reverse sterilization is to sterilize the electrode part, it is preferable that the discharge flow in the normal sterilization or reverse sterilization is relatively low. For reference, the discharge flow of the normal sterilization may be the same as the discharge amount of the reverse sterilization. Here, the discharge flow may be controlled through a diameter of a pipe. As an example, when a pipe diameter after the discharge valve 343 or drain valve 345 is smaller than a pipe diameter after the purge valve 342, the discharge flow may be small.

Meanwhile, when the filter unit 100 includes two electrode parts 110a and 110b, the water treatment device according to the present embodiment may further include a valve for controlling flow 346 at the bottom of the discharge valve 343. Here, the valve for controlling flow 346 may control the amount of regeneration water discharged to the outside to control the rate between purified water and regeneration water.

As an example, when the first electrode part 110a is in the water-purifying mode and the second electrode part 110b is in the regeneration mode, only the purge valve 342a and discharge valve 343b will be open. The rest will be closed. In this case, it is assumed that raw water is supplied from the supply unit 310 to the filter unit 100 in an amount of 10. When the valve for controlling flow 346 is controlled so that regeneration water could be discharged from the second electrode part 110b to the outside in an amount of 2, raw water will be supplied from the supply unit 310 to the first electrode part 110a in an amount of 8.

For reference, the water treatment device according to the present embodiment may further include another filter in addition to the filter unit 100. As an example, the water treatment device according to the present embodiment may further include a pre-carbon filter 401 for mainly removing chlorine substance, or a post-carbon filter 402 for mainly removing smell, as illustrated in FIG. 5.

[Effect of Sterilization Mode]

Figure 6:
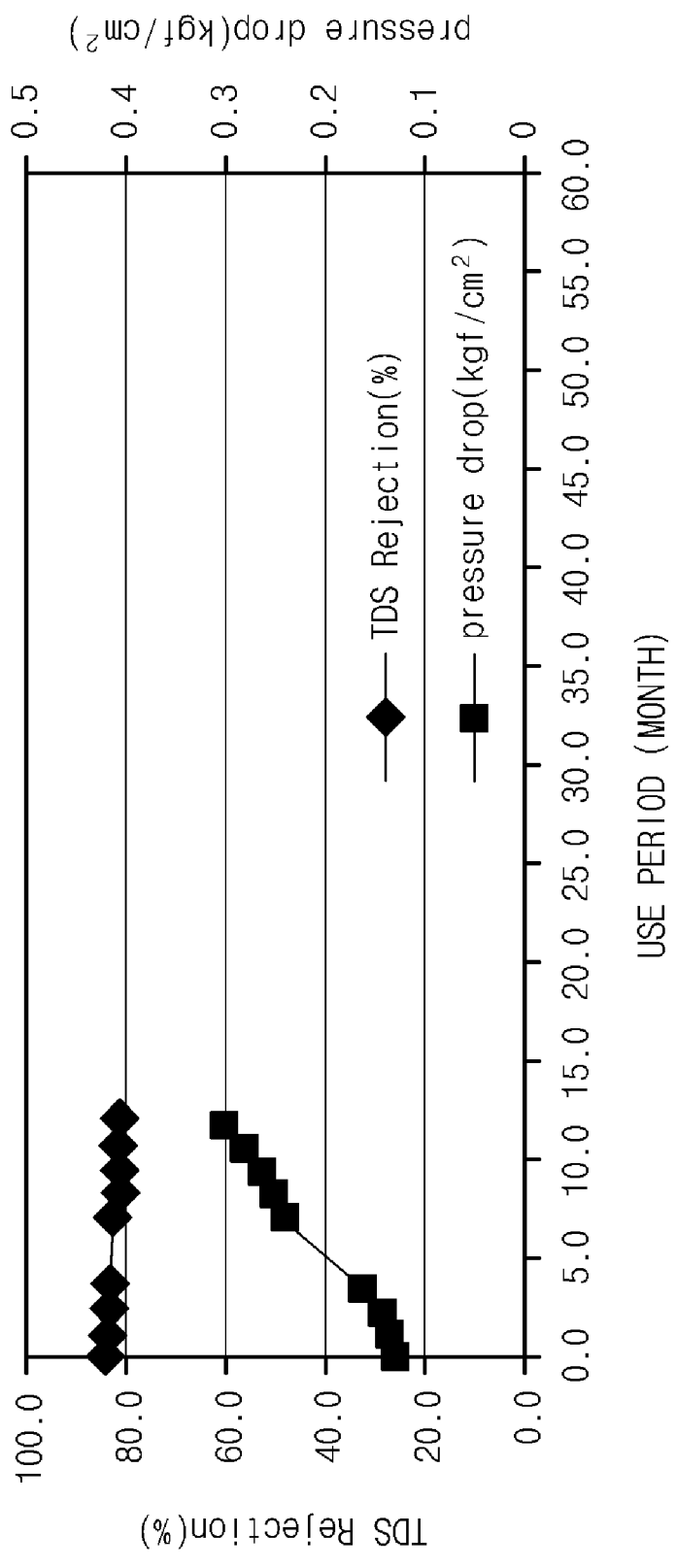
FIG. 6 is a graph showing a TDS rejection and a pressure drop according to the use period of the water treatment device when the electrode part is not sterilized.

FIG. 6 is a graph illustrating a TDS rejection and a pressure drop according to the use period of the water treatment device in case of not sterilizing the electrode mode. When the electrode part is not sterilized, as illustrated in FIG. 6, bacteria may increase in the electrode part 110, which may lead to the increase in the pressure drop (a pressure difference between the outlet and inlet). Accordingly, a lifespan of the filter may be reduced.

Figure 7:
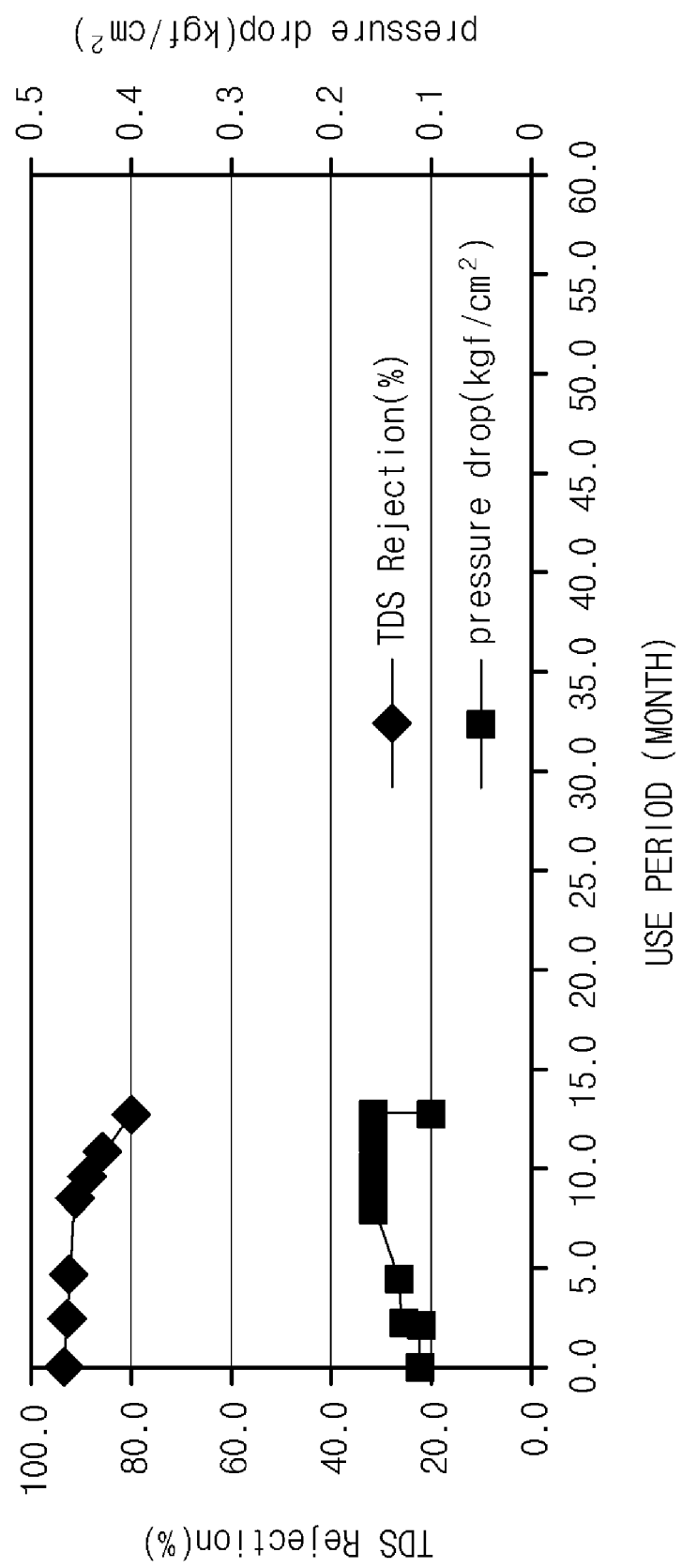
FIG. 7 is a graph showing a TDS rejection and a pressure drop according to the use period of the water treatment device when continuously supplying the sterilization substance to the electrode part regardless of being in the water-purifying mode or regeneration mode.

FIG. 7 is a graph illustrating a TDS rejection and a pressure drop according to the use period of the water treatment device when the sterilization substance is continuously supplied to the electrode part regardless of being in the water-purifying mode or regeneration mode. When continuously supplying the sterilization substance to the electrode part 110 regardless of being in the water-purifying mode or regeneration mode, as illustrated in FIG. 7, the increase in pressure drop may be inhibited. However, the TDS rejection (i.e., contaminant rejection) may be reduced. As explained above, this is caused by the occurrence of inorganic ion such as iron oxide. Meanwhile, even if the TDS rejection is reduced, since the increase in the pressure drop may be inhibited, the supply of the sterilization substance is meaningful.

Figure 8:
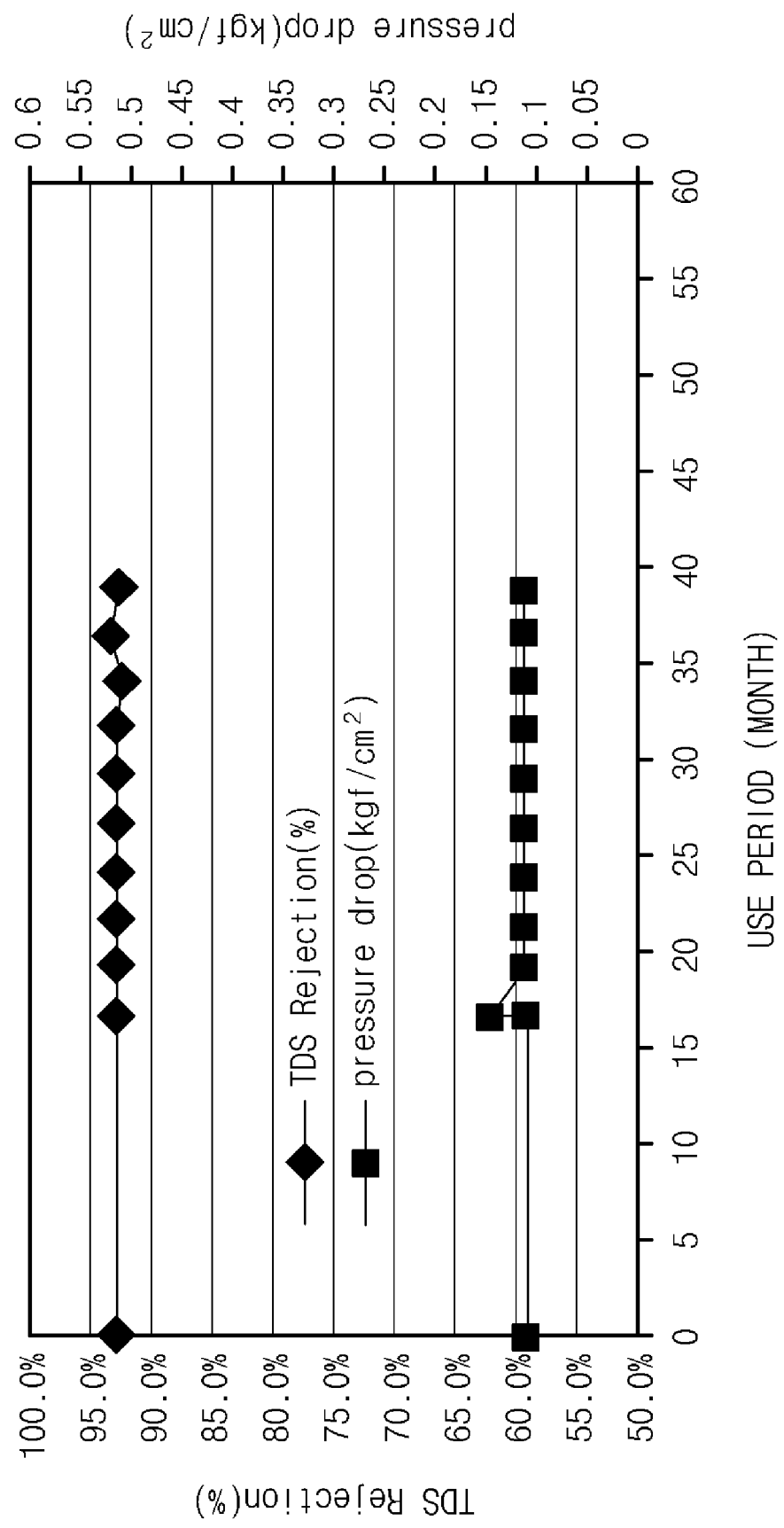
FIG. 8 is a graph showing a TDS rejection and a pressure drop according to the use period of the water treatment device when supplying a sterilization substance to the electrode part whenever a predetermined time passed without performing a water-purifying mode and a regeneration mode.
Figure 9:
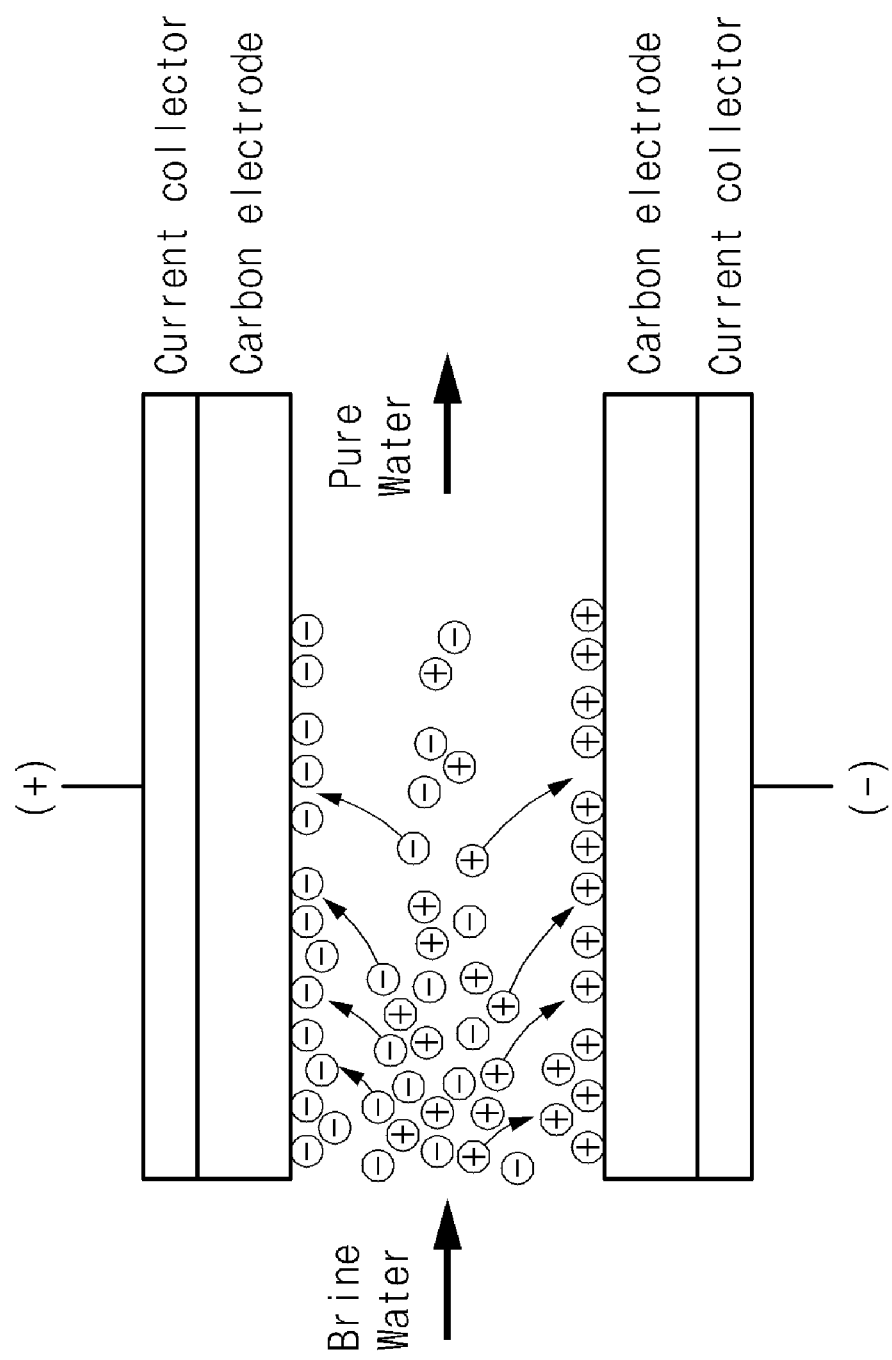
FIG. 9 is a conceptual diagram explaining a principle of achieving purification in a CDI method.
Figure 10:
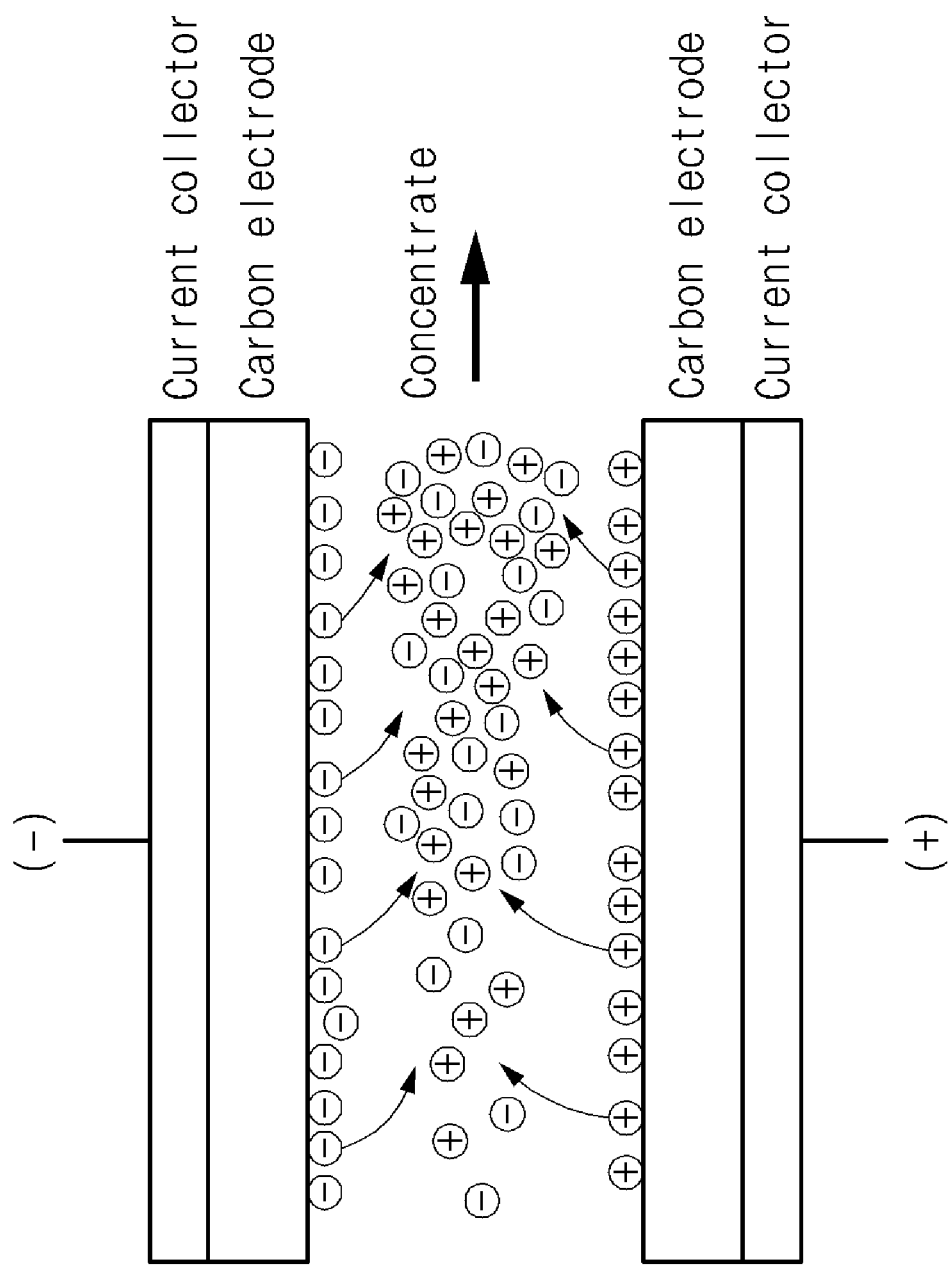
FIG. 10 is a conceptual diagram explaining a principle of achieving regeneration in the CDI method.

FIG. 8 is a graph illustrating a TDS rejection and a pressure drop according to the use period of the water treatment device when supplying the sterilization substance to the electrode part whenever a predetermined time passes with the water-purifying mode and regeneration mode not performed. When supplying the sterilization mode to the electrode mode whenever a predetermined time passes with the water-purifying mode and the regeneration mode not performed, as illustrated in FIG. 8, the increase in pressure drop may be inhibited, and also the TDS rejection may be constantly maintained.

What is claimed is:

1. A method for treating water using a capacitive deionization water treatment device, the device comprising a filter unit to purify raw water by capacitive deionization through an electrode part formed by alternately stacking electrodes and separators, the electrodes including positive electrodes and negative electrodes; a sterilization unit provided on the front of the filter unit, the sterilization unit comprising a sterilization terminal part coated with ruthenium oxide (RuOx) and a sterilization case part accommodating the sterilization terminal part, to supply the electrode part with a sterilization substance which has been generated from the raw water in order to sterilize the electrode part, wherein the sterilization unit reduces chlorine ion ($Cl^-$) in the raw water to chlorine ($Cl_2$); and a control unit configured to control power supplied to the filter unit; the method comprising:

operating the control unit to control the filter unit in a water-purifying mode for purifying the raw water at the electrode part, the control unit supplying positive power to the positive electrodes and supplying negative power to the negative electrodes in the water-purifying mode, after the water-purifying mode, operating the control unit to control the filter unit in a regeneration mode for regenerating, the control unit supplying negative power to the positive electrodes and supplying positive power to the negative electrodes in the regeneration mode;

after the operating the control unit to control the filter unit in the water-purifying mode and the operating the control unit to control the filter unit in the regeneration mode, operating the control unit to control the filter unit not to perform the water-purifying mode and not to perform the regeneration mode for a predetermined time; and upon passing of the predetermined time with the water-purifying mode and the regeneration mode not performed, operating the control unit to perform a control of supplying power to the sterilization terminal part for sterilizing bacteria in the electrode part, the sterilization unit reducing the chlorine ion ($Cl^-$) in the raw water to the chlorine ($Cl_2$) in a sterilization mode.

2. The method of claim 1, wherein in the case of operating the sterilization mode, the control unit controls a strength of power to be supplied to the sterilization terminal part according to total dissolved solids (TDS) of the raw water.

3. The method of claim 1, wherein in the case of operating the sterilization mode, the control unit controls a strength of power to be supplied to the sterilization terminal part according to a strength of current flowing in the electrode part when a certain voltage is applied to the electrode part in the water-purifying mode.

4. The method of claim 1, wherein in the case of operating the water-purifying mode, the filter unit is configured to discharge purified water, wherein in the case of operating the regeneration mode, the filter unit is configured to discharge regeneration water, and wherein the filter unit includes an inlet to which the raw water is supplied, an outlet from which the purified water or the regeneration water is discharged, and a filter case part accommodating the electrode part.

5. The method of claim 4, wherein in the case of operating the sterilization mode, the raw water is supplied to the inlet or outlet through the sterilization unit.

6. The method of claim 4, wherein in the case of operating the sterilization mode, the raw water is supplied to the inlet through the sterilization unit by a first flow rate during the operation of the sterilization unit for a first sterilization for the electrode part.

7. The method of claim 6, wherein in the case of operating the sterilization mode, the raw water is supplied to the outlet through the sterilization unit by a second flow rate during the operation of the sterilization unit for a second sterilization for the electrode part.

8. The method of claim 7, wherein in the case of operating the sterilization mode, the raw water is supplied to the outlet through the sterilization unit by a third flow rate, the third flow rate greater than the first flow rate or greater than the second flow rate, for back washing of the electrode part.

9. The method of claim 4, wherein the device further comprises a supply unit supplying the raw water to the filter unit; a purge unit purging the purified water to a user; a discharge unit discharging the regeneration water to the outside; and a valve unit performing opening and closing, the valve unit including a supply valve installed on a flow path passing from the supply unit to the inlet; a purge valve installed on a flow path passing from the outlet to the purge unit; a discharge valve installed on a flow path passing from the outlet to the discharge unit; a washing valve installed on a flow path passing from a front of the supply valve to the outlet; and a drain valve installed on a flow path passing from a rear of the supply valve to the outside;

wherein in the case of operating the water-purifying mode, the regeneration mode and the sterilization mode, the control unit controls opening and closing of the supply valve, the purge valve, the discharge valve, the washing valve, and the drain valve.

10. The method of claim 9, wherein the control unit performs a control of opening the supply valve, closing the discharge valve, opening the purge valve, closing the washing valve, and closing the drain valve, during non-operation of the sterilization unit in the water-purifying mode.

11. The method of claim 9, wherein the control unit performs a control of opening the supply valve, opening the discharge valve, closing the purge valve, closing the washing valve, and closing the drain valve, during non-operation of the sterilization unit in the regeneration mode.

12. The method of claim 9, wherein the control unit performs a control of opening the supply valve, opening the discharge valve, closing the purge valve, closing the washing valve, and closing the drain valve, during operation of the sterilization unit for a first sterilization for the electrode part in the sterilization mode.

13. The method of claim 12, wherein the control unit performs a control of closing the supply valve, closing the discharge valve, closing the purge valve, opening the washing valve, and opening the drain valve, during operation of the sterilization unit for a second sterilization for the electrode part in the sterilization mode.

14. The method of claim 13, wherein the control unit performs a control of closing the supply valve, closing the discharge valve, closing the purge valve, opening the washing valve, and opening the drain valve for back washing of the electrode part in the sterilization mode.

* * * * *